(No Model.)
E. SALTZKORN & L. NICOLAI.
RIVETING MACHINE.
No. 517,172. Patented Mar. 27, 1894.
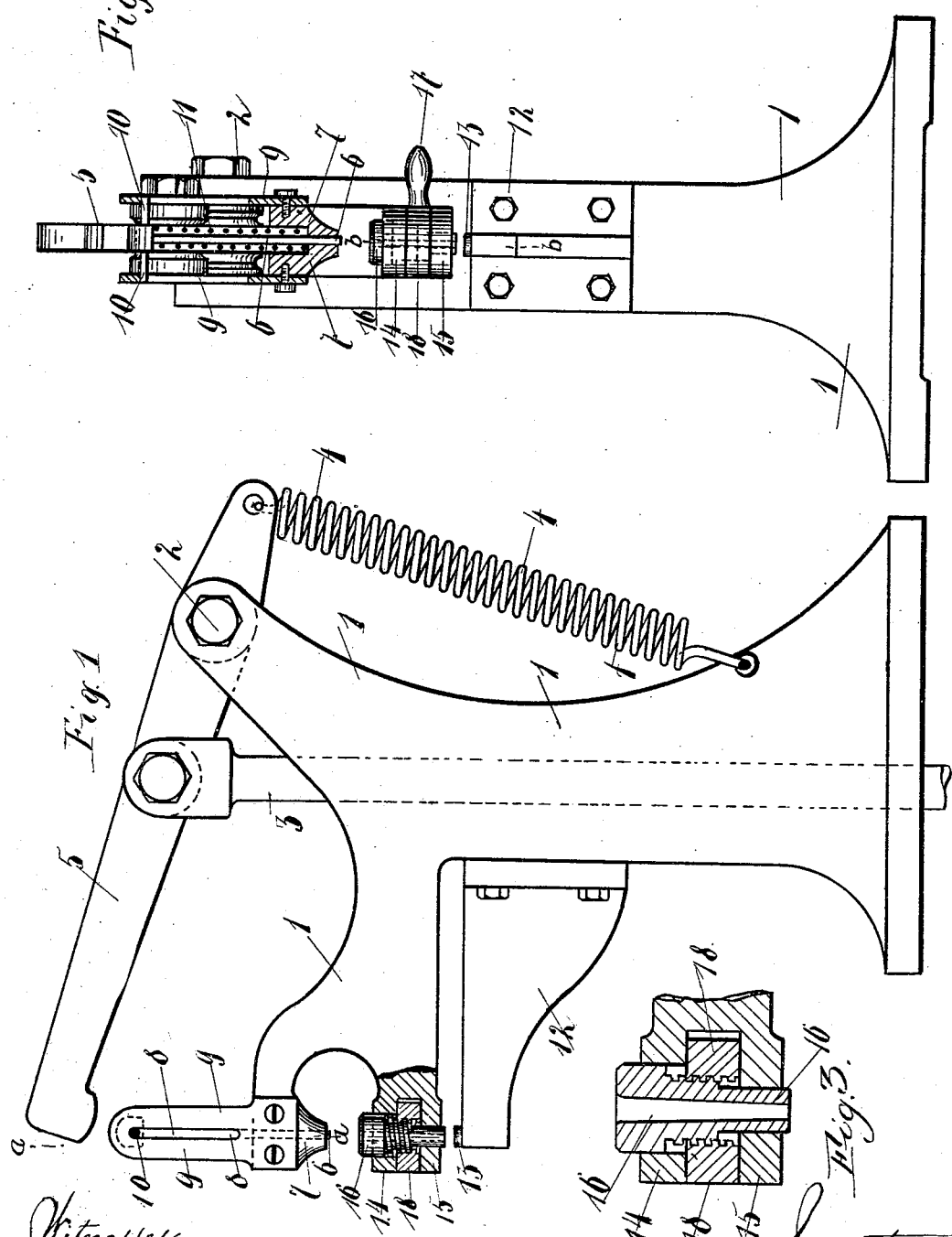

UNITED STATES PATENT OFFICE.

EMIL SALTZKORN AND LUDWIG NICOLAI, OF DRESDEN, GERMANY.

RIVETING-MACHINE.

SPECIFICATION forming part of Letters Patent No. 517,172, dated March 27, 1894.

Application filed December 9, 1893. Serial No. 493,203. (No model.)

*To all whom it may concern:*

Be it known that we, EMIL SALTZKORN and LUDWIG NICOLAI, subjects of the King of Saxony, residing in the city of Dresden, in the Kingdom of Saxony, German Empire, have invented certain new and useful Improvements in Riveting or Clamping Machines, of which the following is a specification.

Our invention relates to certain improvements in riveting machines and has for its principal object to provide for the holding of the pieces to be riveted during the operation of the machine.

In the accompanying drawings:—Figure 1 is a side elevation, partially in section, illustrating a riveting machine constructed in accordance with our invention. Fig. 2 is a front elevation of the same partially in section on the line *a—a*, Fig. 1, and Fig. 3 is a transverse sectional elevation, on a somewhat larger scale, on the line *b—b* Fig. 2.

The various operating parts of the machine are supported upon the frame 1 from which extends a bracket 12, carrying at 13 an anvil immediately in line with a header 6, the latter being provided with cross bars 10 adapted to guiding slots 8, in plates 9 secured on either side of a bushing 7. The header is normally held in the inoperative position illustrated by a coiled compressing spring 11 extending around the header 6 from its cross bars 10 to the recessed upper portion of the bushing 7. From the frame 1 project cheeks 14 and 15 in which is guided a rivet feeder 16 having a central preferably conical opening in line with the header 6, and so arranged that a rivet may be inserted in the opening to be forced down through the material by the header and clamped between the latter and the anvil 13. The exterior of the rivet feeder is provided with a screw thread to which is adapted a nut 18 provided with a handle 17, and under the control of the latter, so that when two pieces of material which are to be united are placed upon the anvil the turning of the handle 17 in the proper direction will act to depress the feeder and firmly clamp the pieces together holding them to the anvil; a rivet is then inserted in the upper end of the central opening of the feeder and the header 6 is depressed to drive the rivet through the material to the anvil and secure the pieces together.

The machine herein illustrated is designed to be operated by foot power and the actuating lever 5 for the header is pivoted at 2 to the frame 1, being normally held out of operative position by a coiled tension spring 4, extending from the short end of the lever to the frame. The pedal (not shown) is connected by a link 3, to the lever 5 so that at each depression of the pedal the lever will be pressed down into engagement with the header.

The advantages resulting from the use of a machine of this character are, the avoidance of displacement of any one of the pieces to be united to another while the rivet is being driven, and, further the operator may work with the utmost accuracy and speed as his hands are not needed to hold the pieces in place during the driving of the rivet. The feeder might also be depressed by a lever, or handled cam or other suitable device, as will be readily understood.

Having thus described our invention, what we claim, and desire to secure by Letters Patent, is—

1. The combination with the header and anvil of a rivet feeder, guides therefor, screw threads provided upon the periphery of such feeder, and a handled nut engaging with such thread and adapted to effect the movement of the feeder toward and from the anvil, substantially as specified.

2. The combination of the frame, an anvil carried thereby, a header, guides and operating devices for said header, a rivet feeder having a central tapering opening, guiding cheeks projecting from the frame and in which said feeder is held, screw threads provided upon the periphery of said feeder and a handled operating nut adapted to engage with said screw threads, substantially as specified.

3. The combination of the frame, an anvil carried thereby, a rivet feeder, means for moving the same toward and from the anvil, a header, a cross-head thereon, slotted guiding plates for said crosshead, a supporting spring tending to normally hold the header in inoperative position and means for depressing said header, substantially as specified.

4. The combination of the frame, a bracket 12 secured thereto, an anvil 13 on said bracket, cheeks 14 and 15 projecting from the frame, a rivet feeder 16 guided in said cheeks and having on its periphery a screwthread, a handled nut 18 adapted to engage said screwthread between the cheeks, a header 6, guiding devices therefor, and an operating lever 5 fulcrumed to the frame and means for operating said lever, substantially as specified.

5. The combination of the frame, a bracket 12, secured thereto, an anvil 13 on said bracket, cheeks 14 and 15 projecting from the frame, a rivet feeder 16 guided in said cheeks and having on its periphery a screw-thread, a handled nut 18 adapted to engage said screw-thread between the cheeks, a header 6, a cross head 10 thereon, slotted guiding plates 9 for said cross head, a supporting spring 11 tending to normally hold the header in inoperative position, and means for depressing said header, substantially as specified.

In testimony that we claim the foregoing as our invention we have signed our names in presence of two subscribing witnesses.

EMIL SALTZKORN.
LUDWIG NICOLAI.

Witnesses:
HERNANDO DE SOTO,
MARTHA LOHMANN.